United States Patent [19]

Rosenquist

[11] 4,446,296

[45] May 1, 1984

[54] ACYLOXY TERMINATED POLYCARBONATES

[75] Inventor: Niles R. Rosenquist, Evansville, Ind.

[73] Assignee: General Electric Company, Mt. Vernon, Ind.

[21] Appl. No.: 450,794

[22] Filed: Dec. 17, 1982

[51] Int. Cl.³ .................................................. C08G 63/62
[52] U.S. Cl. ................................... 528/198; 525/462; 528/176
[58] Field of Search ................ 528/198, 176; 525/462

[56] References Cited

FOREIGN PATENT DOCUMENTS

WO82/02389  7/1982  PCT Int'l Appl. .

*Primary Examiner*—Harold D. Anderson
*Attorney, Agent, or Firm*—Martin B. Barancik; Myron B. Kapustij

[57] ABSTRACT

Aromatic polycarbonate resins exhibiting improved heat resistance chain terminated with a residue represented by the general formula

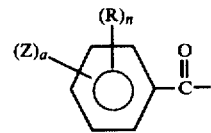

wherein:
  each R is independently selected from monovalent hydrocarbon radicals, substituted monovalent hydrocarbon radicals, or halogen radicals;
  a represents a whole number having a value of from 1 to 3 inclusive;
  n represents a whole number having a value of from 0 up to the number of replaceable hydrogen atoms present on the ring carbon atoms of the aromatic nucleus; and
  each Z is independently selected from radicals represented by the general formulae

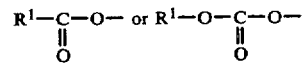

wherein $R^1$ is selected from rigid or bulky monovalent hydrocarbon radicals or rigid or bulky substituted monovalent hydrocarbon radicals. The instant resins may be fabricated into molded articles, films, and sheets.

26 Claims, No Drawings

ACYLOXY TERMINATED POLYCARBONATES

BACKGROUND OF THE INVENTION

The importance of chain terminating or end-capping polycarbonates by means of certain molecular weight regulating or chain terminating compounds is well known. Polycarbonates which are not end-capped or chain terminated are insufficiently heat stable since the free phenolic end groups provide a reactive site which is detrimental to the stability of the carbonate polymer. Furthermore, the absence of a chain terminating or end-capping agent or condition during the preparation of aromatic polycarbonates results in a polymer with a molecular weight which often is so high that the polymer is too viscous to mold at reasonable temperatures.

Standard chain terminating agents employed in the preparation of aromatic polycarbonates are members of the phenol family such as phenol itself and tertiary butyl phenol. Other known chain terminating agents for polycarbonates include alkanol amines, disclosed in U.S. Pat. No. 3,085,992; imides, disclosed in U.S. Pat. No. 3,399,172; aniline and methyl aniline, disclosed in U.S. Pat. No. 3,275,601; primary and secondary amines, disclosed in U.S. Pat. No. 4,001,184; aromatic amines forming aryl carbamate terminal groups, disclosed in U.S. Pat. No. 3,028,365; ammonia, ammonium compounds, primary cycloalkyl amines, aliphatic amines, and aralkyl amines forming carbamate terminal groups, disclosed in U.S. Pat. No. 4,111,910.

Further, German Offenlegunsschrift No. 27 16 304, laid open Oct. 19, 1978, discloses the use, as chain terminators, of relatively long chain carboxylic acids or acid halides ($C_9$–$C_{26}$) in conjunction with the usual phenolic chain terminator. Although melt viscosity is lowered, thereby permitting easier processing of the resin, a significant lowering of the heat resistance of the polymer as well as embrittlement of the resin upon aging at elevated temperatures also occur.

Furthermore, according to Schnell, *Chemistry and Physics of Polycarbonates* (1964) page 183, ammonium hydroxide and amines saponify polycarbonates back to the monomers, e.g., bisphenol-A. Likewise, U.S. Pat. No. 3,223,678 discloses that small amounts of amines such as monoethanolamine and morpholine break down or degrade the polycarbonates into lower molecular weight polycarbonates.

Thus, the area of chain terminators and their effects upon the properties of polycarbonates is generally not completely understood and is one where the empirical approach is generally the rule rather than the exception in determining whether a particular compound or class of compounds will function effectively as chain terminators for polycarbonates. This area is further complicated by the fact that not only must a particular compound function as a chain terminator, but this compound, when incorporated into the carbonate polymer chain as a terminal group, must not adversely affect the positive and advantageous properties and characteristics of the polycarbonate. Thus, while some compounds may be effective chain terminators they are not practical since they adversely affect some of the positive and advantageous properties of polycarbonates.

There thus exists a need for chain terminators which can be utilized in producing chain terminated polycarbonates which exhibit improved heat resistance while simultaneously retaining, to a substantial degree, substantially most of their other advantageous properties.

SUMMARY OF THE INVENTION

In accordance with the instant invention there is provided a composition comprising an aromatic polycarbonate chain terminated with a residue represented by the general formula

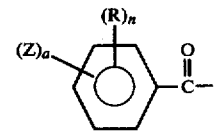

wherein:
each R is independently selected from monovalent hydrocarbon radicals, substituted monovalent hydrocarbon radicals, and halogen radicals;
a represents a whole number having a value of from 1 to 3 inclusive;
n represents a number having a value of from 0 up to the number of replaceable hydrogen atoms present on the ring carbon atoms of the aromatic nucleus; and
each Z is independently selected from radicals represented by the general formulae

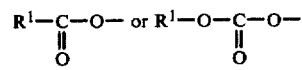

wherein $R^1$ is selected from bulky or rigid monovalent hydrocarbon radicals and bulky or rigid substituted monovalent hydrocarbon radicals.

DESCRIPTION OF THE INVENTION

The instant invention is directed to novel high molecular weight aromatic polycarbonates having as terminal or end groups particular acyloxy residues. The termination or end-capping of the carbonate polymers with these residues results in polycarbonates having controlled molecular weights and exhibiting improved heat resistance while generally retaining, to a substantial degree, substantially most of the positive and advantageous properties of polycarbonates.

Aromatic polycarbonates can be prepared by any of the known usual methods. These polymers can be prepared by reacting a dihydric phenol with a carbonate precursor.

The dihydric phenols useful in preparing the polycarbonates of the instant invention are in general represented by the general formula

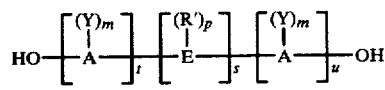

wherein A represents an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidene, etc. Where E is an alkylene or alkylidene group it may also consist of two or more alkylene or alkylidene groups connected by a non-alkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group (e.g. cyclopentyl, cyclohexyl, cyclopropyl, etc.); a sulfur containing linkage such as sulfide, sulfoxide or sulfone; a carbonyl group; an ether linkage; a tertiary nitrogen group; or a silicon-containing linkage such as siloxy or silane. R' is hydrogen or a monovalent hydrocarbon group such as alkyl (methyl ethyl, propyl, isopropyl, butyl, tertiary butyl, etc.); aryl (phenyl, naphthyl, etc.); aralkyl or alkaryl (benzyl, ethylphenyl, etc.); or a cycloaliphatic group (cyclohexyl, cyclopentyl, cyclopropyl, etc.). Y may be an inorganic atom such as chlorine, bromine, etc.; an inorganic group such as the nitro group, etc.; an organic group such as R'; or an oxy group such as OR', it being only necessary that Y be inert to and unaffected by the reactants and reaction conditions. The letter m is any whole number from and including zero through the number of positions on A available for substitution; p is any whole number from and including zero through the number of available positions on E; t is a whole number equal to at least one; s is either zero or one; and u is any whole number including zero.

In the dihydric phenol compound represented by Formula I, when more than one Y substituent is present they may be the same or different. The same is true for the R substituent. Where s is zero in Formula I and u is not zero, the aromatic rings are directly joined with no intervening alkylene or other bridge. The positions of the hydroxyl groups and Y on the aromatic nuclear residues A can be varied in the ortho, meta, or para positions and the groupings can be in a vicinal, asymmetrical or symmetrical relationship, where two or more ring carbon atoms of the aromatic hydrocarbon residue are substituted with Y and hydroxyl group.

Some illustrative nonlimiting examples of dihydric phenols represented by Formula I include:

2,2-bis-(4-hydroxyphenyl)-propane (bisphenol-A);
2,4'-dihydroxdiphenylmethane;
bis-(2-hydroxyphenyl)-methane;
bis-(4-hydroxyphenyl)-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,1-bis-(4-hydroxy-2-chlorophenyl)-ethane;
2,2-bis-(3-phenyl-4-hydroxyphenyl)-propane;
bis-(4-hydroxyphenyl)-cyclohexylmethane;
2,2-bis-(4-hydroxyphenyl)-1-phenylpropane; and the like.

Other dihydric phenols are disclosed in U.S. Pat. Nos. 2,999,835; 3,028,365; 3,334,154; 3,148,172 and 2,288,282, all of which are incorporated herein by reference. Bisphenol-A is the preferred dihydric phenol from the standpoint of providing polycarbonates with the best mix of properties.

It is, of course, possible to employ mixtures of two or more different dihydric phenols as well as individual dihydric phenols where a carbonate copolymer is desired.

The carbonate precursor which is reacted with the dihydric phenols of Formula I to form the carbonate polymer can be a carbonyl halide, a carbonate ester or a haloformate. The carbonyl halides which can be employed herein are carbonyl bromide, carbonyl chloride, and mixtures thereof. Typical of the carbonate esters which may be employed herein are diphenyl carbonate, di-(halophenyl) carbonates such as di-(chlorophenyl) carbonate, di-(bromophenyl)carbonate, di-(trichlorophenyl) carbonate, di-(tribromophenyl) carbonate, etc., di-(alkylphenyl) carbonates such as di-(tolyl) carbonate, di-(naphthyl) carbonate, di-(chloronaphthyl) carbonate, phenyl tolyl carbonate, chlorophenyl chloronaphthyl carbonate, etc. and mixtures thereof. The haloformates suitable for use as carbonate precursors include bis-haloformates of dihydric phenols (bischloroformates of hydroquinone), or glycols (bis-haloformates of ethylene glycol, neopentyl glycol, polyethylene glycol, etc.). Carbonyl chloride, also known as phosgene, is the preferred carbonate precursor.

One of the methods for preparing high molecular weight aromatic carbonate polymers involves the heterogeneous interfacial polymerization system utilizing an aqueous caustic solution, an organic water immiscible solvent, at least one dihydric phenol of Formula I, a catalyst, a molecular weight regulator, and a carbonate precursor. A preferred heterogeneous interfacial polymerization system is one which utilizes phosgene as the carbonate precursor and methylene chloride or chlorobenzene as the organic solvent.

The catalysts which are employed can be any of the suitable and well known catalysts that aid the polymerization of the dihydric phenol with the carbonate precursor. Suitable catalysts include, but are not limited to, tertiary amines such as triethylamine, tripropylamine, and the like; quaternary ammonium compounds such as tetraethyl ammonium bromide, cetyl ammonium bromide, and the like; and quaternary phosphonium compounds such as n-butyltriphenyl phosphonium bromide, methyltriphenyl phosphonium bromide, and the like.

Another useful method for preparing the carbonate polymers involves the use of an organic solvent system wherein the organic solvent system may also function as an acid acceptor, at least one dihydric phenol of Formula I, a molecular weight regulator, and a carbonate precursor. A preferred method is one utilizing phosgene as the carbonate precursor and pyridine or triethylamine as the acid acceptor.

Generally, in both of the aforedescribed methods phosgene is passed into a reaction mixture containing at least one dihydric phenol of Formula I. The temperature at which the phosgenation reaction proceeds may vary from below 0° C. to above 100° C. The reaction proceeds satisfactorily at temperaures from room temperature (25° C.) to 50° C. Since the reaction is exothermic, the rate of phosgene addition may be used to control the reaction temperature.

The carbonate polymers of the instant invention are end capped or chain terminated with at least one residue represented by the general formula

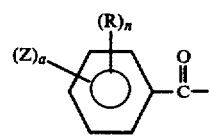

II.

wherein:

each R is independently selected from monovalent hydrocarbon radicals, substituted monovalent hydrocarbon radicals, and halogen radicals;

a represents a whole number having a value of from 1 to 3 inclusive;

n represents a number having a value of from 0 up to the number of replaceable hydrogen atoms present of the ring carbon atoms of the aromatic nuclear residue; and each Z is independently selected from radicals represented by the general formulae

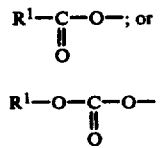

wherein $R^1$ is selected from bulky or rigid monovalent hydrocarbon radicals and bulky or rigid substituted monovalent hydrocarbon radicals.

The monovalent hydrocarbon radicals represented by R are selected from alkyl radicals, both straight chain and branched, aryl radicals, alkaryl radicals, and aralkyl radicals. The preferred alkyl radicals are those containing from 1 to about 6 carbon atoms and include, for example, methyl, ethyl, propyl, isopropyl, butyl, and the like. The preferred aryl radicals are those containing from 6 to 12 carbon atoms and include phenyl, naphthyl and biphenyl. The preferred alkaryl and aralkyl radicals are those containing from 7 to about 14 carbon atoms.

The substituted monovalent hydrocarbon radicals represented by R are those monovalent hydrocarbon radicals described above which have at least one hydrogen atom replaced by an inorganic atom or group or an inorganic atom containing organic group, e.g., halogen, a nitro group, an amine group, or a —$OR^2$ radical wherein $R^2$ is a monovalent hydrocarbon radical such as an alkyl or aryl. Thus, the substituted monovalent hydrocarbon radicals represented by R are selected from substituted alkyl radicals, substituted aryl radicals, substituted alkaryl radicals, and substituted aralkyl radicals. Some illustrative nonlimiting examples of these substituted monovalent hydrocarbon radicals include methoxy, propoxy, phenoxy, chlorobutyl, dichloropropyl, dibromophenyl, nitrophenyl, and the like.

The preferred halogen radicals represented by R are chlorine and bromine.

When more than one R substituent is present on the ring carbon atoms of the aromatic hydrocarbon residue they may be the same or different.

Preferred residues of Formula II are those wherein n is zero.

The bulky or rigid monovalent hydrocarbon radicals represented by $R^1$ are selected from branched alkyl radicals, cycloalkyl radicals, alkyl substituted cycloalkyl radicals, and the aryl radicals. The preferred branched alkyl radicals are those containing from 3 to about 8 carbon atoms and include isopropyl, tertiarybutyl, isobutyl, neopentyl, 2,3-dimethylpropyl, isohexyl, and the like. The preferred cycloalkyl radicals are those containing from 4 to about 7 ring carbon atoms. The preferred alkyl substituted cycloalkyl radicals are those containing from 4 to 7 ring carbon atoms wherein from 1 to about 3 of the hydrogen atoms of the ring carbon atoms are replaced with lower alkyl radicals, preferably those lower alkyl radicals containing from 1 to about 4 carbon atoms. Some illustrative nonlimiting examples of these cycloalkyl radicals and alkyl substituted cycloalkyl radicals include cyclopropyl, cyclopentyl, cyclohexyl, methylcyclohexyl, ethylcyclohexyl, and the like.

The preferred aryl radicals represented by $R^1$ are those containing from 6 to about 20 carbon atoms. These include, but are not limited to, phenyl, naphthyl, biphenyl, and the like. The more preferred aryl radicals are those represented by the general formula

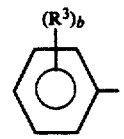

wherein:
each $R^3$ is independently selected from alkyl radicals, aryl radicals, alkaryl radicals, and aralkyl radicals; and b is a whole number having a value of from 0 to 5 inclusive Preferred alkyl radicals represented by $R^3$ are the branched alkyl radicals containing from 3 to about 8 carbon atoms. The preferred aryl radicals are those containing from 6 to 12 carbon atoms and include phenyl, naphthyl, biphenyl.

The preferred alkaryl and aralkyl radicals represented by $R^3$ are those containing from 7 to about 14 carbon atoms and include benzyl, ethylphenyl, phenylpropyl, and the like.

When more than one $R^3$ substituent is present on the aromatic nuclear residue they may be the same or different.

The bulky or rigid substituted monovalent hydrocarbon radicals represented by $R^1$ are those monovalent hydrocarbon radicals described hereinafore wherein at least one hydrogen atom of the monovalent hydrocarbon radical has been replaced with an inorganic group or atom such as a nitro group or a halogen radical such as chlorine and bromine. Thus, the bulky or rigid substituted monovalent hydrocarbon radicals represented by $R^1$ are selected from substituted branched alkyl radicals, substituted cycloalkyl radicals, substituted, alkyl substituted cycloalkyl radicals, and substituted aryl radicals.

The preferred substituted branched alkyl radicals are those containing from 3 to about 8 carbon atoms and from 1 to 3 substituent groups such as halogen or nitro groups.

The preferred substituted cycloalkyl radicals are those containing from 4 to 7 ring carbon atoms wherein from 1 to about 3 of the ring carbon hydrogen atoms have been replaced with inorganic atoms or groups.

The preferred substituted, alkyl substituted cycloalkyl radicals are those containing from 4 to 7 ring carbon atoms and from 1 to 3 alkyl groups on the ring carbon atoms, wherein from 1 to about 3 of the ring carbon atom's hydrogens have been replaced with an inorganic group or atom.

The preferred substituted aryl radicals are those containing from 6 to 20 carbon atoms wherein from 1 to about 3 of the aromatic nuclear residues carbon atoms have had their hydrogen atoms replaced with inorganic groups or atoms. The more preferred substituted aryl radicals are those represented by the general formula

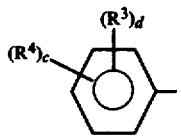

wherein:
R³ is as defined above;
each R⁴ is independently selected from an inorganic atom or group, preferably from the nitro group, chlorine, and bromine;
c is a whole number having a value of from 1 to about 3; and
d is a whole number having a value of from 0 up to the number of replaceable hydrogen atoms present on the ring carbon atoms of the aromatic nuclear residue inclusive.

The preferred radicals of Formula III are those wherein $R^1$ is selected from those radicals represented by Formula V. That is to say, the preferred radicals of Formula III are those represented by the general formula

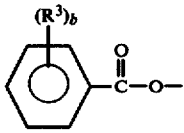

wherein $R^3$ and b are as defined hereinafore.

The preferred radicals of Formula IV are those wherein $R^1$ is selected from those radicals represented by Formula V. That is to say, the preferred radicals of Formula IV are those represented by the general formula

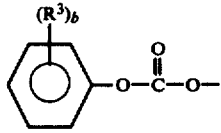

wherein $R^3$ and b are as defined hereinafore.

The preferred radicals of Formula VII are those wherein $R^3$ is an alkyl group, preferably a branched alkyl group, and b is one. The preferred radicals of Formula VIII are those wherein $R^3$ is an aralkyl group and b is one.

The preferred residues of Formula II are those wherein Z is selected from radicals of Formula VII or radicals of Formula VIII. The more preferred residues of Formula II are those wherein Z is selected from radicals of Formulae VII or VIII and wherein a is 2.

The residues of Formula II can be derived from various corresponding compounds. It is preferred to utilize compounds represented by the general formula

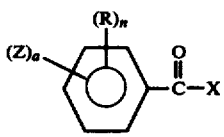

wherein R, Z, n, and a are as defined hereinafore; and X is selected from the chlorine radical, bromine radical, hydroxyl radical, and the

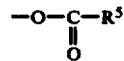

radical wherein $R^5$ represents a lower alkyl radical containing from 1 to about 4 carbon atoms.

Some nonlimiting illustrative examples of compounds falling within Formula IX include:

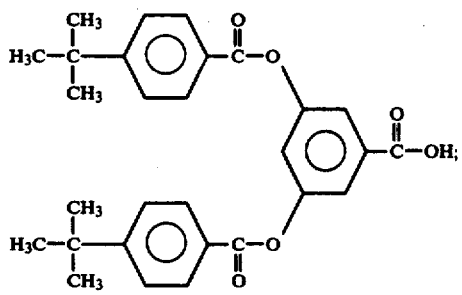

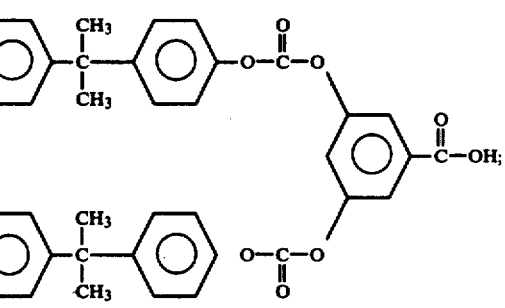

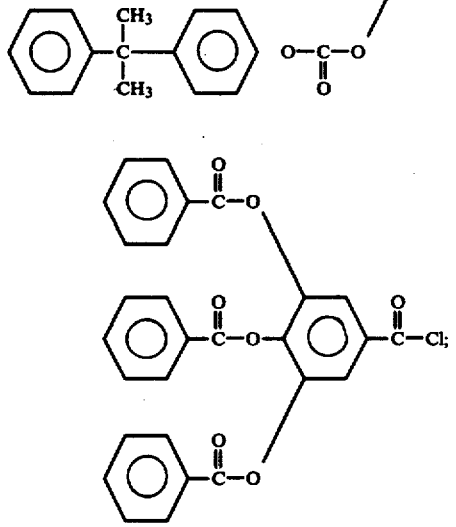

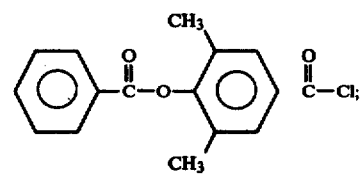

-continued

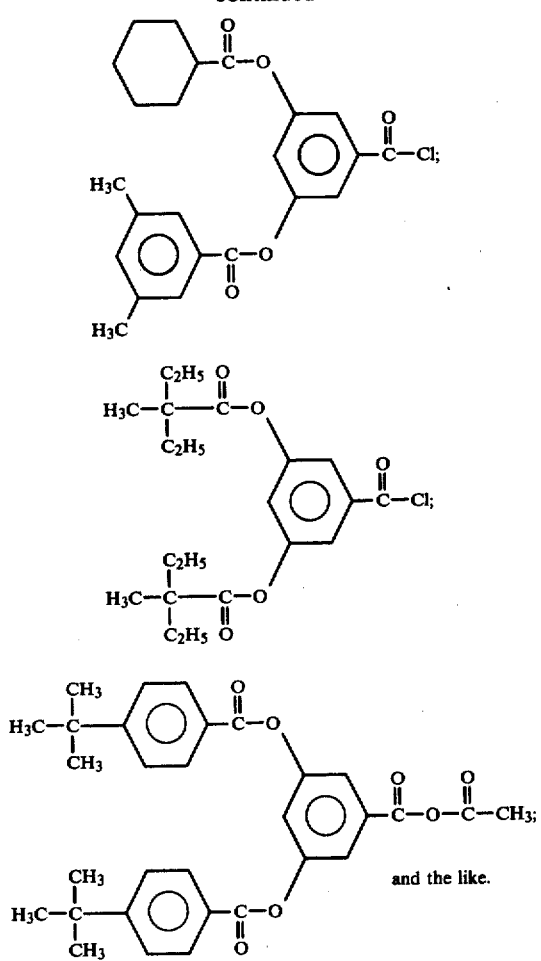

and the like.

The compounds of Formula IX function as endcapping or chain terminating agents serving to control or regulate the molecular weight of the carbonate polymers in the process of the instant invention. The chain terminating agents react with the hydroxyl groups of the bisphenols thereby forming an ester bond and resultant terminal groups represented by the formula

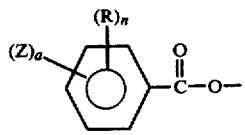

X.

wherein R, Z, n and a are as defined hereinafore. The compounds of Formula IX are added to the reaction process of polycarbonate formation so that their presence can influence the chain length, and therefore the molecular weight of the carbonate polymer, as well as merely react with the phenol end group.

The weight average molecular weight of the polycarbonate is generally controlled, by the use of compounds of Formula IX, in the range of from about 5,000 to about 200,000, preferably from about 10,000 to about 100,000, and more preferably from about 20,000 to about 50,000. The molecular weight is generally dependent upon the amount of the compound of Formula IX employed during the polycarbonate formation reaction. Generally, the larger the amount of the compound of Formula IX present, the lower the molecular weight. Conversely, the smaller the amount of the compound of Formula IX employed the greater the molecular weight of the carbonate polymer.

The introduction of the molecular weight regulating compound of Formula IX can generally be introduced into the reaction between the dihydric phenol and the carbonate precursor initially, prior to the addition of the carbonate precursor; or during the addition of the carbonate precursor; and in general at any time up to the point of the reaction where the degree of polymerization approaches that of a high polymer.

The quantity of the chain terminating agent of Formula IX which can be employed is a chain terminating amount. By chain terminating amount is meant an amount effective to prepare an aromatic polycarbonate having a conventional molecular weight. That is to say, a molecular weight sufficiently high for the polycarbonate resin to exhibit the positive and advantageous properties but insufficiently high for the polymer to become too viscous for any practical application. Generally, this amount ranges from about 0.5 to about 10 mole percent, based on the amount of the dihydric phenol employed in the reaction, preferably from about 1 to about 7 mole percent, and more preferably from about 2 to about 5 mole percent.

In practicing the present invention only one compound of Formula IX may be utilized, in which case all of the end groups or terminal groups of the carbonate polymer will generally be the same; or two or more different compounds of Formula IX may be used, in which instance the polymers will contain a mixture of different terminal groups depending on the number, amount, and type of compounds of Formula IX utilized. Additionally, the compounds of Formula IX may be used in conjunction with known phenol or other chain terminators. In such instances the polymer will contain a mixture of terminal groups formed from the respective chain terminating compounds.

The compositions of the instant invention may optionally contain admixed therewith the commonly known and used additives such as, for example, antioxidants; hydrolytic stabilizers such as the epoxides; ultraviolet radiation absorbers such as the benzophenones, benzotriazoles, and cyanoacrylates; impact modifiers; fillers such as glass fibers, talc, and the like; color stabilizers such as the organophosphites disclosed in U.S. Pat. Nos. 4,138,379, 4,118,370 and 3,305,520, all of which are hereby incorporated herein by reference; and flame retardants.

Some useful flame retardants are those disclosed in U.S. Pat. Nos. 3,915,926 and 4,197,232; and the organic alkali metal salts and organic alkaline earth metal salts of sulfonic acids as described in U.S. Pat. Nos. 3,933,734, 3,948,851, 3,926,968, 3,919,167, 3,909,490, 3,953,396, 3,931,100, 3,978,024, 3,953,399, 3,917,559, 3,951,910 and 3,940,366, all of which are hereby incorporated herein by reference.

DESCRIPTION OF THE PREFERRED EMBODIMENT

The following examples are set forth to further illustrate the present invention and are not to be construed as limiting the invention thereto. Unless otherwise specified, where parts or percentages are mentioned, they are parts or percentages by weight.

EXAMPLE 1

This example illustrates the preparation of an end capping compound of Formula IX. More specifically, this example illustrates the preparation of an end capping compound represented by the formula

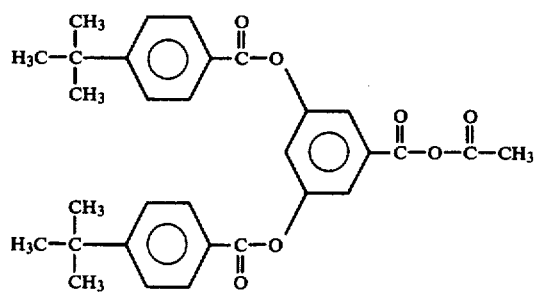

XI.

In a 300 ml three neck flask fitted with two dropping funnels and a drying tube and containing a stir bar were mixed 15.4 grams (0.1 mole) of 3,5-dihydroxybenzoic acid, 100 ml methylene chloride (dried over 4 Å molecular sieves) and 14 ml (0.1 mole) of triethylamine (dried over 4 Å molecular sieves). To this slurry was added dropwise over 10 minutes 8.2 grams (0.105 mole) acetyl chloride. After about 10 minutes additional stirring, the reaction mixture became a nearly clear solution. An additional 28 ml (0.2 mole) triethylamine was added. Then 42.4 grams (0.22 mole) tertiary butyl benzoyl chloride was added dropwise over 20 minutes. A precipitate (triethylamine hydrochloride) formed. After 45 minutes additional stirring, the reaction mixture was filtered, the solid washed several times with methylene chloride, and the solvent removed from the methylene chloride soluble portion to yield a brown, semi-solid paste.

This procedure was repeated on a three times scale and the product purified by redissolving it in 500 ml of methylene chloride, washing that solution twice with 200 ml of water, drying the methylene chloride solution over anhydrous calcium sulfate, removing the solvent under vacuum to yield a thick oily paste, dissolving the paste in 100 ml of boiling toluene, and cooling. The product crystallized and was collected by vacuum filtration and washed with about 10 ml toluene to yield a nearly white power [mp 192° to 195.5° C.; ir 1795 cm$^{-1}$, 1750 cm$^{-1}$, 1730 cm$^{-1}$; pmr $\delta$1.4 (2 peaks with 1.5 Hz separation, 21H), $\delta$7.4 to $\delta$7.6 (multiplet, 5H), $\delta$7.9 to $\delta$8.3 (multiplet, 6H)].

PREPARATION OF CHAIN TERMINATED BISPHENOL-A POLYCARBONATE

General scheme for the preparation of chain terminated polycarbonate derived from bisphenol-A and phosgene.

A 1000 ml four neck flask is fitted with a mechanical stirrer, a pH probe, gas inlet tube, and a Claisen adapter to which is attached a dry ice condenser and an aqueous caustic inlet tube. To the flask are added 280 ml of water, 350 ml of methylene chloride, 1.4 ml of triethylamine (0.01 mole) and 57 grams (0.25 mole) bisphenol-A. With stirring the pH is raised to 10 by the addition of 25% aqueous sodium hydroxide, then the particular amount of the particular end-capping agent utilized is added. Phosgene is introduced into the flask at the rate of one gram per minute for 30 minutes (0.3 mole) with the pH maintained at 9.5 to 11.5. The pH is adjusted to 11 at the end of the reaction. The resin layer is separated from the brine layer, washed with 3 weight % aqueous HCl until the washing remains acidic, then twice with distilled water. The resin is then precipitated with 1500 ml of methanol in a Waring blender and washed with a further 500 ml of methanol.

Using this procedure various chain terminated bisphenol-A type polycarbonates were prepared. The IV (intrinsic viscosity as determined in methylene chloride at 25° C.) and the Tg (glass transition temperature in °C.) is reported for each polycarbonate resin in Table I.

TABLE I

| Example No. | Chain Terminator | Grams of Chain Terminator | Mole % Chain Terminator | IV (dl/gm) | Tg °C. |
|---|---|---|---|---|---|
| 2 | phenol | 1.41 | 6.0 | 0.353 | 145 |
| 3 | phenol | 0.85 | 3.6 | 0.421 | 147 |
| 4 | phenol | 0.85 | 3.6 | 0.477 | 151 |
| 5 | acetyl chloride* | 1.46 | 7.4 | 0.507 | 152 |
| 6 | cmpd. XI | 4.89 | 3.79 | 0.343 | 153.5 |
| 7 | cmpd. XI | 4.21 | 3.26 | 0.365 | 153 |
| 8 | cmpd. XI | 4.19 | 3.25 | 0.380 | 153 |
| 9 | cmpd. XI | 3.49 | 2.70 | 0.418 | 155 |
| 10 | cmpd. XI | 2.79 | 2.16 | 0.477 | 158 |
| 11 | cmpd. XI | 2.33 | 1.80 | 0.532 | 159 |

*Due to hydrolysis side reaction acetyl chloride is a relatively inefficient chain terminating agent and must be used at twice the level at which phenol terminating agent is used to achieve comparable IV's.

In Table I "cmpd. XI" refers to compound of Formula XI produced in Example 1. The compound of Formula XI is a mixed anhydride derived from two different acids. As such, when this compound is used as a chain terminating agent terminal groups of two different types are found on the resultant polycarbonate. One of these terminal groups is the acetate group,

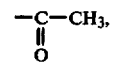

while the other is represented by the formula

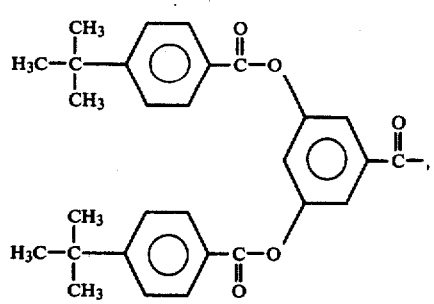

a residue falling within the scope of the instant invention. Thus, the use of the compound of Formula XI results, in effect, in polycarbonates which contain 50% of prior art terminal groups, i.e., acetate groups, and 50% of the residues of the instant invention, i.e., the residue of the formula set forth immediately above.

The ability of each mole of the compound of Formula XI to provide 2 moles of terminal groups is illustrated in Table I wherein it can be seen that polycarbonate resins with approximately equivalent intrinsic viscosities to those of the prior art controls (Examples 2-5) are produced from the use of the compound of Formula XI when half as much, on a mole % basis, of the compound of Formula XI is used in the polycarbonate formulation as that of the prior art chain terminating agents. Small deviations from this can be attributed to the loss of small portions of the

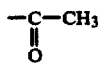

groups of XI to hydrolysis.

The data in Table I further clearly illustrates that polycarbonates produced by employing the compound of Formula XI as a chain terminating agent have improved glass transition temperatures over the prior art controls of Examples 2-5, even though the instant polycarbonates (Examples 6-11) contain only about 50 mole % of the instant residues as terminal groups, the other 50 mole % being the acetate groups.

Table I clearly shows the improved glass transition temperatures exhibited by polycarbonates formulated utilizing the instant chain terminating agents. Thus, the resin of Example 6 has a Tg that is more than 2° C. higher than the Tg of the prior art polycarbonate of Example 4, even though the prior art polycarbonate of Example 4 has a much higher intrinsic viscosity than the instant polycarbonate of Example 6. Generally, for polycarbonates the Tg is somewhat related, to a certain degree, to the intrinsic viscosity of the polycarbonate. Thus, for the same polycarbonate resin, i.e., one which is derived from the same dihydric phenol, the same carbonate precursor, and the same end-capping agent, generally the higher the intrinsic viscosity the higher the glass transition temperature. Conversely, the lower the intrinsic viscosity the lower the glass transition temperature.

Comparing the polycarbonates of the instant invention, e.g., Example 9, with prior art polycarbonates of generally comparable intrinsic viscosity, e.g., Example 3, it is apparent that the polycarbonates of the instant invention exhibit greatly improved glass transition temperatures.

In Table I Examples 2-5 are of polycarbonates prepared with prior art end-capping agents and fall outside the scope of the instant invention. They are presented for comparative purposes only.

It will thus be seen that the objects set forth herein among those made apparent from the preceding description are efficiently attained, and since certain changes may be made in carrying out the above processes and compositions without departing from the scope of the invention, it is intended that all matters contained in the above description shall be interpreted as illustrative and not in a limiting sense.

What is claimed is:

1. An aromatic polycarbonate resin chain terminated with at least one residue represented by the general formula

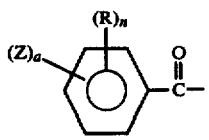

wherein:

each R is independently selected from monovalent hydrocarbon radicals, substituted monovalent hydrocarbon radicals, or halogen radicals;

a represents a whole number having a value of from 1 to 3 inclusive;

n represents a whole number having a value of from 0 up to the number of replaceable hydrogen atoms present on the ring carbon atoms of the aromatic nuclear residue; and Z is independently selected from radicals represented by the general formulae

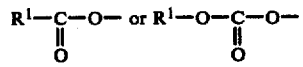

wherein $R^1$ is selected from bulky or rigid monovalent hydrocarbon radicals or bulky or rigid substituted monovalent hydrocarbon radicals.

2. The resin of claim 1 wherein said monovalent hydrocarbon radicals represented by R are selected from alkyl radicals, aryl radicals, aralkyl radicals, or alkaryl radicals.

3. The resin of claim 1 wherein said substituted monovalent hydrocarbon radicals represented by R are selected from substituted alkyl radicals, substituted aryl radicals, substituted aralkyl radicals, or substituted alkaryl radicals.

4. The resin of claim 1 wherein n is zero.

5. The resin of claim 1 wherein said bulky or rigid monovalent hydrocarbon radicals are selected from branched alkyl radicals, cycloalkyl radicals, alkyl substituted cycloalkyl radicals, or aryl radicals.

6. The resin of claim 5 wherein said branched alkyl radicals contain from 3 to about 8 carbon atoms.

7. The resin of claim 5 wherein said cycloalkyls contain from 4 to about 7 ring carbon atoms.

8. The resin of claim 5 wherein said alkyl substituted cycloalkyl radicals contain from 4 to about 7 ring carbon atoms and from 1 to about 3 substituent alkyl groups on the ring carbon atoms.

9. The resin of claim 5 wherein said aryl radicals are represented by the general formula

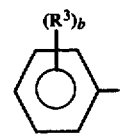

wherein:

each $R^3$ is independently selected from alkyl radicals, aryl radicals, aralkyl radicals, or alkaryl radicals; and b represents a whole number having a value of from 0 to 5 inclusive.

10. The resin of claim 9 wherein said aromatic polycarbonate is derived from bisphenol-A and a carbonate precursor.

11. The resin of claim 10 wherein said carbonate precursor is phosgene.

12. The resin of claim 1 wherein said bulky or rigid substituted monovalent hydrocarbon radicals are selected from substituted branched alkyl radicals, substituted cycloalkyl radicals, substituted alkyl substituted cycloalkyl radicals, or substituted aryl radicals.

13. The resin of claim 1 wherein Z is independently selected from radicals represented by the general formula

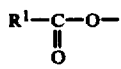

wherein $R^1$ is selected from bulky or rigid monovalent hydrocarbon radicals or bulky or rigid substituted monovalent hydrocarbon radicals.

14. The resin of claim 13 wherein a is 2 and n is zero.

15. The resin of claim 13 wherein $R^1$ is selected from bulky or rigid monovalent hydrocarbon radicals.

16. The resin of claim 15 wherein said bulky or rigid monovalent hydrocarbon radicals are selected from branched alkyl radicals, cycloalkyl radicals, alkyl substituted cycloalkyl radicals, or aryl radicals.

17. The resin of claim 16 wherein said bulky or rigid monovalent hydrocarbon radicals are selected from alkyl radicals.

18. The resin of claim 16 wherein said aryl radicals are represented by the general formula

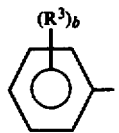

wherein $R^3$ is independently selected from alkyl radicals, aryl radicals, alkaryl radicals, or aralkyl radicals; and b is a whole number having a value of from 0 to 5 inclusive.

19. The resin of claim 18 wherein said aromatic polycarbonate is derived from bisphenol-A and a carbonate precursor.

20. The resin of claim 19 wherein said carbonate precursor is phosgene.

21. The resin of claim 18 wherein b is one.

22. The resin of claim 21 wherein $R^3$ is a tertiary butyl radical.

23. The resin of claim 22 wherein n is zero.

24. The resin of claim 1 wherein said aromatic polycarbonate is derived from bisphenol-A and a carbonate precursor.

25. The resin of claim 24 wherein said carbonate precursor is phosgene.

26. The resin of claim 25 wherein said residue is represented by the formula

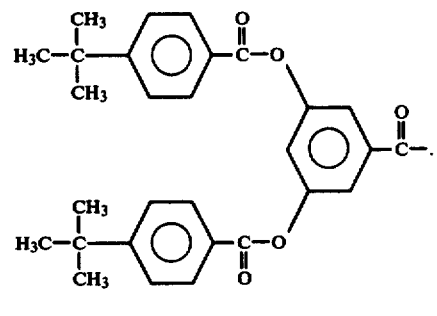

* * * * *